United States Patent Office 2,945,029
Patented July 12, 1960

2,945,029

PROCESS FOR THE PRODUCTION OF 3α-ACETOXY-17α-HYDROXY-16α-METHYL-Δ9(11) - PREGNENE-20-ONE AND INTERMEDIATES

Gerard Nominé, Noisy-le-Sec, France, assignor to Les Laboratoires Francais de Chimiotherapie, Paris, France, a corporation of France No Drawing. Filed Dec. 31, 1959, Ser. No. 863,110

Claims priority, application France January 7, 1959

9 Claims. (Cl. 260—239.55)

This invention relates to novel steroids and their preparation. More particularly this invention relates to the preparation of the steroid, 3α-acetoxy-17α-hydroxy-16α-methyl-Δ9,(11)-pregnene-20-one (VIII), from the known compound: 3α-acetoxy-16-methyl-Δ16-pregnene-11,20-dione (I) by a combination of new chemical reactions involving the preparation of heretofore unknown intermediates.

It is therefore an object of the present invention to provide for novel steroids of the pregnane and pregnene series and processes for their preparation.

It is further an object to provide for a novel synthesis to obtain the steroid 3α-acetoxy-17α-hydroxy-16α-methyl-Δ9,(11)-pregnene-20-one (VIII).

In accordance with the present invention which can be followed by reference to the flow sheet of Table I, 3α-acetoxy - 16 - methyl - Δ16 - pregnene - 11,20 - dione is transformed into its 20-ketal derivative (II), which in turn is converted to the 16β-methyl-16α,17α-epoxide (III) by the action of a peracid. The 11-keto group of the epoxide (III) may then be reduced to an 11β-hydroxy radical and the 3α-acetoxy-11β-hydroxy-16β-methyl-16α,17α-epoxy-pregnane-20-ketal (IV) thus obtained is dehydrated in the 9(11)-position of the nucleus of the pregnene derivative (V). Alternatively, the epoxide (III) may be first converted to the 3α,11β-diol (IVa) then esterified in the 3-position to yield compound IV. Compound V is rearranged to form the 3α,17α-dihydroxy-16α-methyl-Δ9(11)-pregnene-20-ketal (VI) which is esterified at the 3α-position to yield the 3α-acetoxy compound (VII) which, upon hydrolysis, yields 3α-acetoxy-17α-hydroxy-16α-methyl-Δ9(11)-pregnene-20-one (VIII), the final product of the method of this invention.

The present invention provides a method whereby, and in accordance with, Compound I is transformed by a series of steps involving seven stages into the final product VIII. It may be followed and more clearly understood by reference to the following stagewise analysis and Table I.

TABLE 1

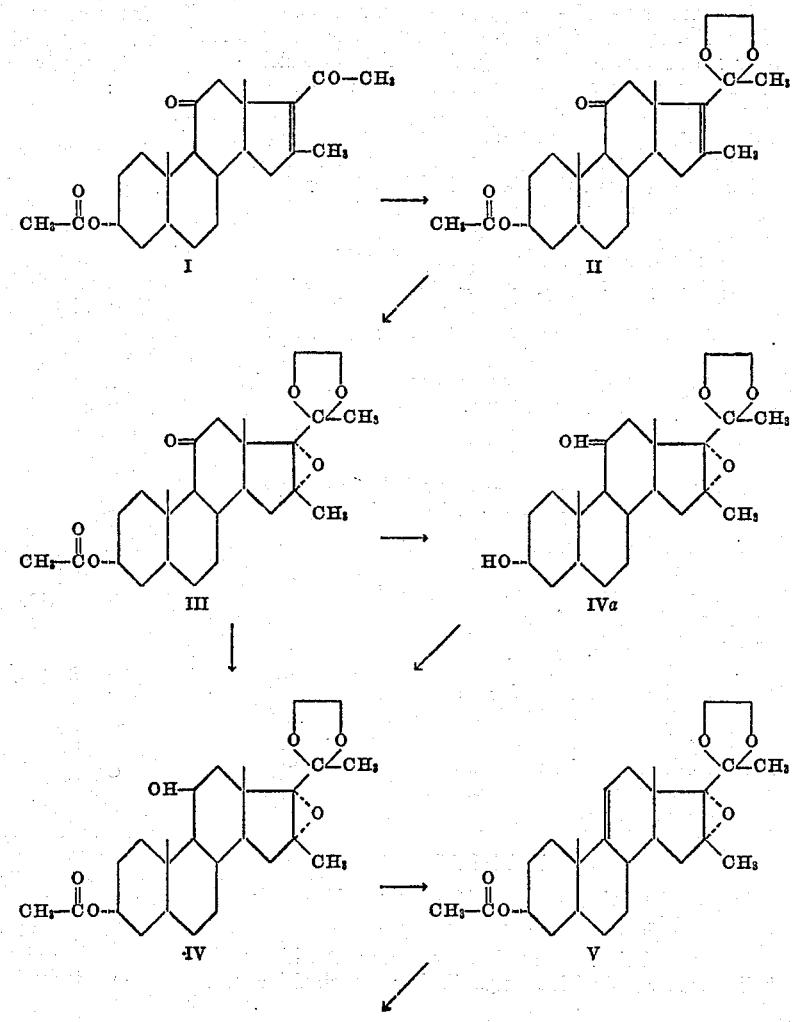

TABLE 1—Continued

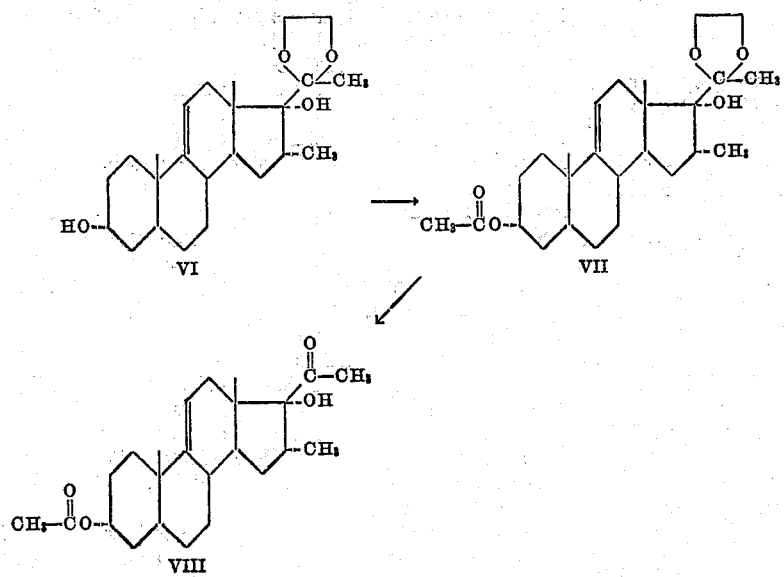

STAGE I

*Preparation of 3α-acetoxy-16-methyl-20-ketal-Δ¹⁶-pregnene-11-one (II)*

3α - acetoxy - 16 - methyl - Δ¹⁶ - pregnene - 11,20-dione (I), is treated under anhydrous conditions under a stream of nitrogen in an organic medium in which it is soluble (e.g., an aromatic solvent, such as benzene or toluene; or dimethylformamide) with a glycol under acid conditions. Any glycol which will react with the keto radical to form a ketal may be employed, preferred glycols being chosen from the class of vicinal lower alkylene glycols including for example, ethyleneglycol. The acid is chosen from any of the conventional mineral acids such as hydrochloric, nitric, or perchloric acid.

The mixture of Compound I, the glycol and the acid in the solvent medium is refluxed for a time sufficient to assure complete reaction. After completion of the reaction, the reaction mixture, upon neutralization, extraction and recrystallization as necessary, yields Compound II in relatively pure form.

STAGE II

*Preparation of 3α-acetoxy-16β-methyl-16α,17α-epoxy-20-ketal-pregnane-11-one (III)*

Compound II is treated at ambient temperature in an anhydrous solvent medium with a per carboxylic acid capable of forming an epoxy group at the 16,17-position. Suitable acids include the peralkanoic acids (e.g., peracetic acid) and aromatic hydrocarbon percarboxylic acids (e.g., perbenzoic acid and preferably perphthalic acid). Suitable solvents include the chlorinated hydrocarbons, such as the chlorinated lower alkanes, for example, dichloroethane. The reaction mixture upon being washed, neutralized, dried and recrystallized in the conventional manner yields substantially pure Compound III in crystalline form.

STAGE III

*Preparation of 3α-acetoxy-11β-hydroxy-16β-methyl-16α,17α-epoxy-20-ketal-pregnane (IV)*

Compound III is reduced as by treatment with an alkali metal borohydride (e.g., lithium borohydride and potassium borohydride) in an aqueous inert organic solvent, such as 50% aqueous tetrahydrofuran, under basic conditions. The reduction is effected at slightly elevated temperatures and under an inert atmosphere. The reaction yields Compound IV which may be separated by neutralization, extraction and recrystallization.

Alternatively, Compound IV may be prepared as follows:

STAGE IIIa

*Preparation of Compound IV through the intermediate 3α-hydroxy Compound IVa*

Compound III dissolved in an anhydrous organic medium is reduced with a suspension of an alkali metal-aluminum hydride (e.g., lithium-aluminum hydride) in an inert organic solvent, such as ether. The temperature of reaction, initially low, is allowed to rise gradually to room temperature and is finally increased by external heating to the reflux temperature. Refluxing is continued until reaction is complete after which the excess hydride is destroyed by the addition of water. Compound IVa is obtained by extraction with an organic solvent such as an aromatic hydrocarbon, and finally recrystallization from an alkanol, such as methanol.

Compound IVa, is transformed to Compound IV by acylation with an acylating agent, such as acetyl chloride or acetic acid anhydride, in pyridine. Compound IV thus obtained may be used in subsequent stages without further purification.

STAGE IV

*Preparation of 3α-acetoxy-16β-methyl-16α,17α-epoxy-20-ketal-Δ⁹⁽¹¹⁾-pregnene (V)*

Compound IV is dissolved in an organic solvent which is inert to dehydrating conditions (e.g., dimethylformamide) and is next treated with a dehydrating agent in an alkaline or buffered medium. Suitable dehydrating agents are the acid chlorides, especially sulfonyl chlorides e.g., toluene sulfonyl chloride or methyl sulfonyl chloride, in pyridine. The reaction temperature rises and after a period of time falls, accompanied by precipitation of Compound V from the reaction mixture. Compound V can be obtained in purified form by conventional techniques including filtration, washing and recrystallization.

STAGES V TO VII

*Preparation of 3α-acetoxy-17α-hydroxy-16α-methyl-Δ9(11)-pregnene-20-one (VIII)*

*Stage V.*—Compound V is rearranged with a reagent capable of opening the epoxy radical and transforming the 16β-methyl radical to a 16α-methyl radical. A suitable reagent for this purpose is a mixture of a lower alkyl amine and an alkali metal or alkaline earth metal, as for example metallic lithium. A preferred combination is lithium in ethylamine. The reaction is conducted at reduced temperature and under an inert atmosphere. After reaction the reaction mixture is freed of excess lithium by the addition of ammonium chloride, purified and then ether extracted. The residue remaining after evaporation in vacuo of the ether is Compound VI which may be used directly for the preparation of Compound VIII.

*Stage VI.*—Compound VI obtained in stage V is acylated with a reagent capable of acylating the 3α-hydroxy radical. Suitable acylating agents include the acid halide or acid anhydride of the acid having the desired acyl radical. A preferred reagent is acetic acid anhydride in a pyridine medium. Compound VII thus obtained may be separated from the acylation mixture by water wash, ether extraction, neutralization and evaporation in vacuo to yield a dry residue which may be used as such in the de-ketalization step of the final stage.

*Stage VII.*—Compound VII is hydrolyzed as by treatment with an acid to yield the corresponding de-ketalized derivative VIII. Suitable acids include mineral acids (e.g., hydrochloric acid) and strong organic acids (e.g., sulfonic acids such as methyl, benzene and preferably p-toluene sulfonic acids). The reaction is advantageously conducted in a solvent medium under anhydrous conditions. Any solvent which will dissolve the steroid and be inert to dehydration, e.g., acetone, methyl-isobutyl ketone, can be employed. After standing at room temperature for a time sufficient to insure dehydration, the mixture is neutralized, extracted, purified by conventional methods and dried to yield Compound VIII in purified form. The de-ketalization can also be carried out by ketone exchange.

It should be recognized that the above analysis is presented for the purpose of illustrating the invention and that it is possible to use reaction techniques and reagents which are accepted equivalents. For example, solvents, acylation reagents, hydrolyzing reagents, ketalization reagents and temperatures are capable of variation from the above, while yet remaining within the scope of this invention.

Compound VIII, thus obtained, is a highly valuable compound, being primarily useful as an intermediate in the preparation of the known compound hexadecadrol (9α-fluoro-16α-methyl-prednisolone) which is a hormone with a very high cortisone activity described by Arth et al., J. Am. Chem. Soc. 80, 3161 (1958). The preparation of the latter compound from Compound VIII is easily effected (as described in copending application Ser. No. 862,491 filed December 29, 1959, commonly assigned and entitled Process for the Preparation of Halogenated-Δ9(11)-pregnene-diones) after deacetylation in the 3α-position by acetyloxylation at the 21-position, oxidation at the 3-position and bromination to yield ketones of the Formula A:

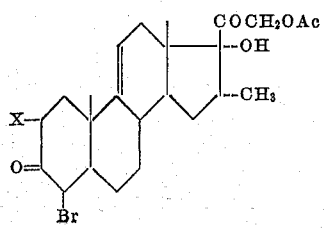

wherein X is a hydrogen or a bromo radical. Ketone A is then dehydrobrominated in a single step when X is bromo or when X is hydrogen, first dehydrobrominated and then dehydrogenated in the 1,2-position to yield the triene of the Formula B:

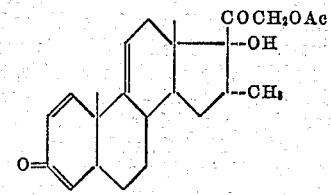

Triene B, is easily transformed into its 9α-fluoro-11β-hydroxy derivative by the method described by Oliveto et al. (J. Am. Chem. Soc. 80, 4431 (1958) thereby making available the desired cortisone-like hormone 9α-fluoro-16α-methylprednisolone.

The following example illustrates the invention without, however, limiting it. The temperatures as given in degrees centigrade, and the melting points are instantaneous melting points determined on a Maquenne block.

EXAMPLE

*Preparation of 3α-acetoxy-17α-hydroxy-16α-methyl-Δ9(11)-pregnene-20-one (VIII)*

STAGE 1.—PREPARATION OF 3α-ACETOXY-16-METHYL-20-DIOXOLANE-Δ16-PREGNENE-11-ONE (II) BY ACETALIZATION OF COMPOUND I

Five gms. of Compound I, prepared by thermolysis of the pyrazoline (Oliveto, J. Am. Chem. Soc. 80, 4428 (1958), are dissolved in 200 cc. of anhydrous benzene. To this solution are added 10 cc. of ethylene glycol and 0.35 cc. of 65% perchloric acid with mechanical agitation and under a stream of nitrogen. The mixture is then refluxed for a total of 5 hours, the ethylene glycol being replenished by the addition of 5 cc. portions every 90 minutes. The refluxing is carried out in such a manner that water vapor is eliminated from the refluxing mixture. After the reaction is terminated, the mixture is cooled to 20° C., poured into 250 cc. of a saturated aqueous solution of sodium bicarbonate, decanted and the organic phase washed with water until neutral. The organic phase is dried over sodium sulfate, filtered and evaporated to dryness in vacuo to yield 5.9 gms. of crude ketal II. This raw product is dissolved in boiling methanol (10 cc.) and crystallized by cooling and scratching to yield crystals of 3α-acetoxy-16-methyl-20-dioxolane-Δ16-pregnene-11-one (II). The mixture is iced, vacuum filtered and the filter cake is washed with a small amount of iced methanol and dried. There is obtained 3.76 gms. of Compound II having a melting point of 147° C. which can be used in the following stage.

For analysis, the compound is recrystallized from ethanol or methanol and has a melting point of 149° C. and a specific rotation of $[\alpha]_D^{20} = +59.5°$ (c=1% in chloroform).

*Analysis.*—$C_{26}H_{38}O_5$: mol. wt.=430.56. Calculated: C, 72.52%; H, 8.89%. Found: C, 72.6%; H, 8.8%.

Compound II is soluble in ethanol, methanol and chlorinated solvents, slightly soluble in isopropyl ether and insoluble in water, petroleum ether and cyclohexane.

This compound is not described in the literature.

STAGE 2.—PREPARATION OF 3α-ACETOXY-16β-METHYL-16α,17α - EPOXY - 20 - DIOXOLANE - PREGNANE-11-ONE (III)

To a solution of 2 gms. of ketal II, prepared according to the preceding stage and dissolved in 16 cc. of dichloroethane, is added 5 cc. of a 28% ethereal solution of perphthalic acid while mechanically agitating at room temperature. The resulting mixture is agitated for 13 hours at 20–25° C. Phthalic acid begins to precipitate at the end of a few minutes. When the reaction time has expired, resultant phthalic acid is separated on a vacuum filter and the filter cake is washed with dichloroethane by trituration. The dichloroethane wash liquors are combined with the filtrate, and this mixture is washed first with aqueous sodium bisulfate, then with an aqueous solution of sodium bicarbonate and finally with water until the wash water is neutral. The dichloroethane phase is dried over anhydrous sodium sulfate, filtered and evaporated to dryness. The dried residue is recrystallized from ethanol to yield 1.7 gms. of the epoxide, 3α-acetoxy-16β-methyl-16α,17α-epoxy - 20 - dioxolane - pregnane-11-one (III), amounting to a yield of 80%. Compound III has a melting point of 210° C. and a specific rotation of $[\alpha]_D^{20} = +72°$ (c=1% in chloroform).

*Analysis.*—$C_{26}H_{38}O_6$: mol. wt.=446.56. Calculated: C, 69.93%; H, 8.58%; O, 21.5%. Found: C, 70.2%; H, 8.7%; O, 21.9.

The product is obtained in the form of brilliant flakes which are soluble in methanol, ethanol and chlorinated solvents; slightly soluble in isopropyl ether; and insoluble in water, petroleum ether and cyclohexane.

This compound is not described in the literature.

STAGE 3.—PREPARATION OF 3α-ACETOXY-11β-HYDROXY-16β-METHYL - 16α,17α - EPOXY-20-DIOXOLANE-PREGNANE (IV)

0.5 gm. of the epoxide III prepared according to the preceding stage are dissolved while agitating under a stream of nitrogen in 20 cc. of a 50% aqueous solution of tetrahydrofuran. The solution is heated to 40° C., and, without interrupting the agitation or the stream of nitrogen a mixture of 0.3 gm. of potassium borohydride, 1 cc. of water and 0.5 cc. of 0.1 N aqueous sodium hydroxide is added all at once. After 5 hours of agitation under nitrogen, the mixture is cooled to 20° C., neutralized with acetic acid to a pH of 7 and 200 cc. of water is added. Compound IV precipitates out. It is extracted with ether and the ether solution washed with water until the wash water is neutral. The ether extract is dried over anhydrous sodium sulfate, filtered and evaporated to dryness. The residue is recrystallized from methanol. After vacuum filtration and drying 0.38 gm. (a yield of 76%) of 3α-acetoxy-11β-hydroxy-16β-methyl-16α,17α - epoxy-20-dioxolane-pregnane (IV), M.P.=176–178° C., is obtained to be used as such for the succeeding stages. For analysis, it is recrystallized from isopropyl ether and has a melting point of 178° C. and a specific rotation of $[\alpha]_D^{20} = +52°$ (c=1% in chloroform).

It is soluble in chlorinated solvents, ethanol, and methanol; slightly soluble in isopropyl ether; and insoluble in water, petroleum ether and cyclohexane.

The compound is not described in the literature.

Alternatively, the same product may be prepared by reduction of the epoxide III with lithium-aluminum hydride. However, in this case the acetoxy radical in the 3-position is saponified and the free alcohol thus obtained must be acetylated as is shown in stage 3a.

STAGE 3a.—PREPARATION OF 3α-ACETOXY-11β-HYDROXY-16β-METHYL - 16α,17α - EPOXY-20-DIOXOLANE-PREGNANE (IV), STARTING WITH EPOXIDE III, BY REDUCTION WITH LITHIUM-ALUMINUM HYDRIDE, FOLLOWED BY RE-ACETYLATION 0.6 gm. of lithium-aluminum hydride is suspended in 50 cc. of anhydrous ether under mechanical agitation and in a stream of nitrogen while excluding moisture from air and the suspension is externally cooled until the internal temperature is lowered to about +2° C. To this suspension gradually is added over a period of 15 minutes, 0.6 gm. of epoxide III dissolved in a mixture of 25 cc. of benzene and 25 cc. of anhydrous ether while maintaining the temperature between 0° and +5° C. Thereafter, the temperature is allowed to rise to 20° C. and is maintained there for ½ hour. The mixture is then boiled under reflux for 1 hour under a stream of nitrogen while excluding moisture from air. The mixture is cooled to about 0° C. carefully treated with 20 cc. of water (to destroy the excess hydride) and finally 50 cc. of benzene is added. The mixture is decanted and the organic layer washed with water until the wash water is neutral. The benzene extract is dried over anhydrous sodium sulfate, filtered and evaporated to dryness. 3α,11β-dihydroxy-16β-methyl-16α,17α-epoxy-20-dioxolane-pregnane (IVa) is obtained, by recrystallization from methanol. The yield is 0.4 gm. (73% of theory); M.P.=183–184° C. After recrystallization from isopropyl ether, the product IVa has a melting point of 185° C. and a specific rotation of $[\alpha]_D^{20} = +39.5°$ (c=1% in chloroform).

*Analysis.*—$C_{24}H_{38}O_5$: mol. wt.=406.54. Calculated: C, 70.90%; H, 9.42%. Found: C, 71.0%; H, 9.4%.

Compound IVa is soluble in methanol, ethanol and chlorinated solvents; slightly soluble in petroleum ether and isopropyl ether; and insoluble in water and cyclohexane. This compound is not described in the literature.

By acetylation at 65° C., with acetic acid anhydride in pyridine, the 11β-hydroxylated epoxide (IV), M.P. =178° C., is obtained. This product shows no depression of the melting point in admixture with the same product obtained in stage 3.

STAGE 4.—PREPARATION OF 3α-ACETOXY-16β-METHYL-16α,17α-EPOXY-20-DIOXOLANE-Δ$^{9(11)}$-PREGNENE (V)

To a solution of 0.95 gm. of Compound IV in 5 cc. of dimethylformamide is added 0.5 cc. of pyridine and 0.42 cc. of methane-sulfonyl chloride. The internal temperature rises to 35°–40° C. and pregnene (V) begins to precipitate out simultaneously with a temperature drop to room temperature. The reaction mixture is allowed to stand for 3 hours at room temperature and poured into ice water. Compound V is separated on a vacuum filter, washed with water until the wash water is neutral and again vacuum filtered. The filter cake is dried and recrystallized from methanol. After drying the crystals a yield of 0.76 gm. (or 83% of theoretical) of 3α-acetoxy-16β-methyl-16α,17α-epoxy - 20 - dioxolane-Δ$^{9(11)}$-pregnene (V), having a melting point of 189° C. and a specific rotation of $[\alpha]_D^{20} = +57.3°$ (c=1% in chloroform) is obtained.

*Analysis.*—$C_{26}H_{38}O_5$; mol. wt.=430.56. Calculated: C, 72.52%; H, 8.89%; O, 18.58%. Found: C, 72.5%; H, 8.8%; O, 19.0%.

It is soluble in chlorinated solvents and dimethylformamide, slightly soluble in methanol and isopropyl ether, and insoluble in water, petroleum ether and cyclohexane.

This compound is not described in the literature.

By saponification with boiling methanol-potassium hydroxide, Compound V yields corresponding 3α-hydroxy-16β - methyl - 16α,17α - epoxy - 20 - dioxolane - Δ$^{9(11)}$-pregnene, having a M.P.=178° C., in a quantitative yield.

STAGES 5, 6 AND 7.—PREPARATION OF 3α-ACETOXY-17α-HYDROXY - 16α - METHYL-Δ$^{9(11)}$-PREGNENE-20-ONE (VIII)

These three stages of the synthesis may be carried out without purification of intermediates VI and VII.

*Stage V.*—0.3 gm. of epoxide V are dissolved in 50 cc. of pure ethylamine in a stream of nitrogen, under mechanical agitation. The resulting solution is cooled to −20° C. and to the cooled solution is rapidly added 0.150 gm. of lithium in small pieces (1 to 2 minutes). The mixture is maintained at −20° C., in the stream of nitrogen, under agitation. The lithium reacts rapidly turning the reaction mixture first mauve and then blue and finally colorless at the end of about 40 minutes. About 1 gm. of anhydrous ammonium chloride is then added to the mixture in order to destroy any excess lithium and the limpid solution turns completely colorless. The ethylamine is driven off in vacuo at about 10–15° C., and, after having cooled the residue to about 0° C., 50 cc. of water is slowly added. The 16α-methyl-17α-hydroxylated derivative (VI) precipitates. The aqueous solution and precipitate is extracted with ether and the ethereal phase is washed first with dilute acetic acid, then with an aqueous solution of sodium bicarbonate and finally with water until the wash water is neutral. The ether extract solution is dried over sodium sulfate and evaporated to dryness. 0.26 gm. of crude $3\alpha,17\alpha$-dihydroxy-16$\alpha$-methyl - 20 - dioxolane - $\Delta^{9(11)}$ - pregnene (VI) (yield of 96%) is thus obtained, which may be directly empolyed in the following stage.

*Stage VI.*—The entire amount of Compound VI (0.26 gm.) is dissolved in 2 cc. of anhydrous pyridine, 1 cc. of acetic acid anhydride is added to the solution and the mixture is heated for 1 hour at 65° C. After which, the reaction mixture is cooled to room temperature, poured into a mixture of ice and water, and the precipitated Compound VII formed thereby is extracted with ether. The ether extract solution is washed with acid, alkali and water, as usual, and after drying over anhydrous sodium sulfate and filtered, is evaporated to dryness. A crude colorless resinous derivative $3\alpha$-acetoxy-17$\alpha$-hydroxy-16$\alpha$-methyl - 20 - dioxolane - $\Delta^{9(11)}$-pregnene (VII), weighing 0.25 gm. (yield of 83%) is obtained, which may be used directly for the final deketalization.

*Stage VII.*—To a solution of Compound VII, dissolved in 30 cc. of anhydrous acetone is added 0.08 gm. of p-toluene sulfonic acid. The mixture is allowed to stand for 40 hours at room temperature and thereafter the acetone is driven off in vacuo. The residue, Compound VIII, is triturated with an aqueous solution of sodium bicarbonate and then extracted with ether. The ether extract is washed with water until the wash water is neutral, dried over anhydrous sodium sulfate, filtered and evaporated to dryness. The residue is crystallized by being taken up in methanol and adding isopropyl ether. 0.1 gm. of 3$\alpha$-acetoxy-17$\alpha$-hydroxy-16$\alpha$-methyl-$\Delta^{9(11)}$-pregnene-20-one (VIII), M.P.=173° C., is obtained. This represents an overall yield of 40% for the three operations (stages V to VII) and the compound is sufficiently pure for transformation into ketone A.

After recrystallization from methanol for analysis, the melting point is 172° C. and the specific rotation is $[\alpha]_D^{20}=+54°\pm0.8$ c=0.5% in acetone). The purified product VIII does not produce a depression of the melting point in admixture with the 3-acetylated derivative of pregnene described in application Ser. No. 862,491.

Since the above example is not given for the purpose of limitation, it does constitute but a preferred mode of execution. More particularly, without departing from the scope of the invention, it is possible to use equivalent techniques whenever it is possible; for example, the nature of the solvents, the amine or the alkali metal used for opening the epoxide linkage may be varied, the temperatures may be varied, the ketal may be formed by double exchange of radicals, the ketone function in the 20-position may be regenerated by acid hydrolysis, or the alcohol group in the 11$\beta$-position may be dehydrated directly without passing through its methane sulfonate. These and any other modifications which may occur to one skilled in the art may be employed without exceeding the spirit of the invention or the scope of the appended claims.

I claim:

1. $3\alpha$ - acetoxy - 16 - methyl - 20 - dioxolane - $\Delta^{16}$-pregnene-11-one.

2. $3\alpha$ - acetoxy - 16$\beta$ - methyl - 16$\alpha$,17$\alpha$ - epoxy - 20-dioxolane-pregnane-11-one.

3. $3\alpha$ - acetoxy - 11$\beta$ - hydroxy - 16$\beta$ - methyl - 16$\alpha$,17$\alpha$-epoxy-20-dioxolane-pregnane.

4. $3\alpha,11\beta$ - dihydroxy - 16$\beta$ - methyl - 16$\alpha$,17$\alpha$ - epoxy-20-dioxolane-pregnane.

5. $3\alpha$ - acetoxy - 16$\beta$ - methyl - 16$\alpha$,17$\alpha$ - epoxy - 20-dioxolane-$\Delta^{9(11)}$-pregnene.

6. $3\alpha$ - hydroxy - 16$\beta$ - methyl - 16$\alpha$,17$\alpha$ - epoxy-20-dioxolane-$\Delta^{9(11)}$-pregnene.

7. $3\alpha,17\alpha$ - dihydroxy - 16$\alpha$ - methyl - 20 - dioxolane-$\Delta^{9(11)}$-pregnene.

8. $3\alpha$ - acetoxy - 17$\alpha$ - hydroxy - 16$\alpha$ - methyl - 20-dioxolane-$\Delta^{9(11)}$-pregnene.

9. A process for preparing 3$\alpha$-acetoxy-17$\alpha$-hydroxy-16$\alpha$-methyl-$\Delta^{9(11)}$-pregnene-20-one which comprises the steps of: (*a*) reacting $3\alpha$ - acetoxy - 16 - methyl - $\Delta^{16}$-pregnene-11,20-dione with a lower vicinal alkylene glycol in an anhydrous acid medium to obtain a 3$\alpha$-acetoxy-16-methyl-20-ketal-$\Delta^{16}$-pregnene-11-one, (*b*) treating the latter in an inert organic solvent with a peracid and recovering a 3$\alpha$-acetoxy-16$\beta$-methyl - 16$\alpha$,17$\alpha$ - epoxy - 20-ketal-pregnane-11-one, (*c*) treating the latter with a reducing agent in an anhydrous basic organic medium, (*d*) dehydrating the resultant 3$\alpha$-acetoxy-11$\beta$-hydroxy-16$\beta$-methyl-16$\alpha$,17$\alpha$-epoxy-20-ketal-pregnene with an acid dehydrating agent and recovering 3$\alpha$-acetoxy - 16$\beta$ - methyl-16$\alpha$,17$\alpha$-epoxy-20-ketal - $\Delta^{9(11)}$ - pregnene, (*e*) rupturing the epoxy group of the latter by means of a metal selected from the group consisting of an alkali metal and an alkaline earth metal in the presence of a lower alkylamine and recovering a 3$\alpha$,17$\alpha$ - dihydroxy - 16$\alpha$-methyl-20-ketal-$\Delta^{9(11)}$-pregnene, (*f*) acetylating the latter and (*g*) thereafter subjecting the acetylated compound thus formed to the action of a strong acid and recovering the 3$\alpha$-acetoxy-17$\alpha$ - hydroxy - 16$\alpha$ - methyl - $\Delta^{9(11)}$-pregnene-20-one thus formed.

References Cited in the file of this patent

UNITED STATES PATENTS

| | | |
|---|---|---|
| 2,648,663 | Julian et al. | Aug. 11, 1953 |
| 2,773,867 | Julian et al. | Dec. 11, 1956 |
| 2,790,799 | Djerassi et al. | Apr. 30, 1957 |

OTHER REFERENCES

Oliveto et al.: 80 J.A.C.S. 4428 (1958).

UNITED STATES PATENT OFFICE
Certificate of Correction

Patent No. 2,945,029                                                                                                 July 12, 1960

Gerard Nominé

It is hereby certified that error appears in the above numbered patent requiring correction and that the said Letters Patent should read as corrected below.

Column 2, line 12, for "of", second occurrence, read —to—; same column 2, Formula IVa, for that portion of the formula reading

 read 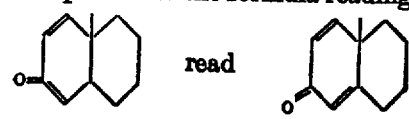

column 6, lines 10 to 13, for that portion of the formula reading

 read 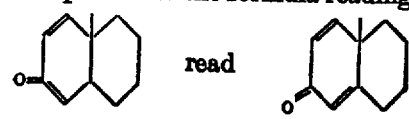

Signed and sealed this 13th day of June 1961.

[SEAL]

Attest:
ERNEST W. SWIDER,
*Attesting Officer.*

DAVID L. LADD,
*Commissioner of Patents.*